UNITED STATES PATENT OFFICE.

GUSTAVE DANGOISE, OF BRUSSELS, BELGIUM, ASSIGNOR TO SOCIÉTÉ GÉNÉRALE BELGE DE DEGLYCERINATION, OF BRUSSELS, BELGIUM, A CORPORATION OF BELGIUM.

PROCESS OF DECOMPOSING FATS.

SPECIFICATION forming part of Letters Patent No. 688,069, dated December 3, 1901.

Application filed June 4, 1901. Serial No. 63,092. (No specimens.)

*To all whom it may concern:*

Be it known that I, GUSTAVE DANGOISE, engineer, residing at Brussels, in the Kingdom of Belgium, have invented a certain new and useful process of separating glycerin from oils and fatty matters under pressure, so as to obtain glycerin in a very pure condition and fatty acids unaltered, of which the following is a specification.

Numerous processes for separating glycerin from fatty matters under pressure by means of apparatus termed "autoclaves" have been long in use, especially in the stearin manufacture, and they are all based upon the principle of separating fatty matters into fatty acids and glycerin by means of water alone or with addition of alkaline bases, metallic oxids, or metals (lime, magnesia, zinc, &c.) under the action of high pressures, and therefore of high temperatures. As the proportion of the base increases the pressure may diminish in obtaining a given amount of glycerin; but if, on the one hand, high pressures and temperatures greatly alter fatty matters the addition of large proportions of lime, magnesia, zinc, &c., causes difficulties quite as great in the succeeding operations, especially by rendering necessary the use of much acid in order to obtain the fatty acids in the state in which they ought to be employed. The problem to be solved, therefore, was to obtain almost all the glycerin contained in the fatty matter without having recourse to high pressures or to large proportions of the bases, which cause the difficulties above referred to. It is this problem that is, according to this invention, solved in the following manner: As in many chemical reactions it is the beginning of the combination that is effected with difficulty and as once begun it goes on easily, according to this invention means are devised for rendering the operation of separating glycerin, as it were, continuous by causing each new operation to begin in presence of a portion of the complex bodies, which result from a complete operation which has effected separation of glycerin, (about five per cent.)

For the separation of glycerin in an autoclave or closed vessel high heat and high pressure are necessary to produce the first combination of the neutral oil with the small quantity of metallic oxid added, and this first combination having been effected there is formed under less pressure and heat acid and basic metallic soaps, which act gradually and from one molecule to another, continuing the reaction and ending by freeing all the glycerin. Therefore by adding at the commencement of an operation to the neutral oil to be treated these acid and basic soaps mixed with fatty acids, which are the result of a preceding reaction, I am enabled to decrease the high pressure and to work at an average pressure of five atmospheres (which corresponds to a temperature of about 150° centigrade) with an addition of one per cent. of oxid of zinc, the complete operation lasting six hours.

In practice at the commencement of each operation I first introduce into the autoclave the fatty material to be treated, mixed with about ten per cent. of water. Then I introduce about five per cent. of the mixture of fatty matters which have been drawn from the autoclave at the preceding operation and which consist of acid soaps, basic soaps, and fatty acids intimately mixed together and which do not separate by precipitation. After this five-per-cent. addition I add in the autoclave about one per cent. of a base, (as, for example, oxid of zinc or metallic zinc or oxid of magnesia or lime or any other suitable base.) Then the autoclave is closed and the contents subjected to a steam-pressure of, say, five to six atmospheres for about six hours, for example. The autoclave is then emptied into a reservoir, where the glycerin is separated. The supernatant part is washed with an acid to transform all the metallic soaps into fatty acids. Previously a part of these supernatant fatty bodies has been drawn off, as already explained, for use in commencing a new operation.

Having thus described the nature of this invention and the best means I know of carrying the same into practical effect, I claim—

The process of separating glycerin from fatty matter, which process consists in leaving in the autoclave, or in introducing into it before each new operation of the usual kind, a portion of the fatty matters combined with the base (alkali or metallic oxid) resulting from a preceding operation.

In testimony whereof I have signed my name to this specification in the presence of two subscribing witnesses.

GUSTAVE DANGOISE.

Witnesses:
GUSTAVE PIERRY,
EMILE NUYTS.